United States Patent
Yang et al.

(10) Patent No.: US 9,235,072 B1
(45) Date of Patent: Jan. 12, 2016

(54) WALL MOUNT DOUBLE-SIDED LIQUID CRYSTAL DISPLAY

(71) Applicant: LITEMAX ELECTRONICS, INC., New Taipei (TW)

(72) Inventors: Tien-Teng Yang, New Taipei (TW); Yao-Nian Chung, New Taipei (TW)

(73) Assignee: LITEMAX ELECTRONICS INC. (TW)

( * ) Notice: Subject to any disclaimer, the term of this patent is extended or adjusted under 35 U.S.C. 154(b) by 77 days.

(21) Appl. No.: 14/325,465

(22) Filed: Jul. 8, 2014

(51) Int. Cl.
| | |
|---|---|
| *G02F 1/1333* | (2006.01) |
| *G02F 1/1335* | (2006.01) |
| *G02F 1/133* | (2006.01) |
| *F21V 8/00* | (2006.01) |

(52) U.S. Cl.
CPC ........ *G02F 1/133308* (2013.01); *G02B 6/0076* (2013.01); *G02F 1/13306* (2013.01); *G02F 2001/133342* (2013.01)

(58) Field of Classification Search
CPC ............... G02F 1/133308; G02F 1/133608; G02F 1/13452; G02F 2001/133317; G02F 1/133615; G02F 1/133603; G02F 1/133604; G02F 1/1393; G02F 1/13306; G09G 3/3648
USPC .................................................. 349/58, 61, 33
See application file for complete search history.

(56) References Cited

U.S. PATENT DOCUMENTS

2006/0187140 A1* 8/2006 Brask .................... G06F 1/1601 345/1.1

\* cited by examiner

*Primary Examiner* — Mike Qi
(74) *Attorney, Agent, or Firm* — Schmeiser, Olsen & Watts, LLP

(57) ABSTRACT

A wall mount double-sided liquid crystal display is simple in structure, lightweight, thin, adjustable in angle, and fixed to a wall, including a base fixed to a wall; a frame pivotally connected to the base through a pivotal connection element; a first liquid crystal display panel unit disposed in the frame; a second liquid crystal display panel unit disposed in the frame in a manner to be parallel and adjacent to the first liquid crystal display panel unit; a first edge-lit backlight unit disposed in the frame; a second edge-lit backlight unit disposed in the frame; a control unit disposed in the base and electrically connected to the first liquid crystal display panel unit, second liquid crystal display panel unit, first edge-lit backlight unit, and second edge-lit backlight unit; and a power unit disposed in the base and electrically connected to the control unit.

8 Claims, 4 Drawing Sheets

WALL MOUNT DOUBLE-SIDED LIQUID CRYSTAL DISPLAY

FIELD OF THE TECHNOLOGY

The present invention relates to liquid crystal displays, and more particularly, to a wall mount double-sided liquid crystal display which is simple in structure, lightweight, thin, and adjustable in angle.

BACKGROUND

At present, billboards displayed at plenty of public spaces, such as playgrounds, airports, shopping malls, bus stations, railway stations, and casinos, typically fall into two categories, namely acrylic billboards and LED (light-emitting diode) billboards.

Acrylic billboards can be updated only by making new ones. In doing so, the owners of the acrylic billboards not only have to pay for the new acrylic billboards but also must patiently await the delivery of new acrylic billboards—production of acrylic billboards takes time.

Owners of LED billboards are never confronted with the aforesaid problems but have to incur high LED billboard maintenance costs and expect that LED billboards usually display colors and patterns which are less attractive than colors and patterns displayed on acrylic billboards, and thus LED billboards attract lookers less than acrylic billboards do in terms of the average time the lookers spend watching the billboards.

In view of the aforesaid drawbacks of acrylic billboards and LED billboards, a promising alternative is LCD (liquid crystal display) billboards. Nonetheless, conventional LCD billboards are not free of drawbacks. For example, at the aforesaid public spaces, a conventional LCD billboard typically consists of two liquid crystal displays arranged in a back-to-back manner so as to face lookers in two opposite directions concurrently. As a result, the most obvious drawback of the back-to-back LCD billboards is that they are bulky and take up much space.

The conventional LCD billboard can also come in the form of a wall mount LCD billboard. As its name suggest, it is fixed to a wall. Its inherent drawbacks include being unadjustable in angle and being impossible to face lookers in two opposite directions concurrently.

Accordingly, it is imperative to invent a liquid crystal display which is capable of facing lookers in two opposite directions concurrently, simple in structure, lightweight, thin, adjustable in angle, and conducive to changing display contents quickly and conveniently.

SUMMARY

In view of the aforesaid drawbacks of the prior art, it is an objective of the present invention to provide a wall mount double-sided liquid crystal display which is simple in structure, lightweight, thin, adjustable in angle, and conducive to changing display contents quickly and conveniently.

In order to achieve the above and other objectives, the present invention provides a wall mount double-sided liquid crystal display which is fixed to a wall. The wall mount double-sided liquid crystal display comprises a base, a frame, a first liquid crystal display panel unit, a second liquid crystal display panel unit, at least a first edge-lit backlight unit, at least a second edge-lit backlight unit, a control unit, and a power unit.

The base is fixed to the wall. The frame is pivotally connected to the base through at least a pivotal connection element. The first liquid crystal display panel unit is disposed in the frame. The first liquid crystal display panel unit has a first displaying surface, a first non-displaying surface, and a plurality of first lateral sides. The second liquid crystal display panel unit is disposed in the frame in a manner to be parallel to the first liquid crystal display panel unit. The second liquid crystal display panel unit has a second displaying surface, a second non-displaying surface, and a plurality of second lateral sides. The first non-displaying surface is adjacent to the second non-displaying surface. The first edge-lit backlight unit is disposed in the frame. The first edge-lit backlight unit is disposed at the first lateral sides of the first liquid crystal display panel unit. The second edge-lit backlight unit is disposed in the frame. The second edge-lit backlight unit is disposed at the second lateral sides of the second liquid crystal display panel unit. The control unit is disposed in the base and electrically connected to the first liquid crystal display panel unit, the second liquid crystal display panel unit, the first edge-lit backlight unit, and the second edge-lit backlight unit. The power unit is disposed in the base and electrically connected to the control unit.

As regards the wall mount double-sided liquid crystal display, the control unit has a first control unit and a second control unit. The first control unit is electrically connected to the first liquid crystal display panel unit and the first edge-lit backlight unit. The second control unit is electrically connected to the second liquid crystal display panel unit and the second edge-lit backlight unit.

As regards the wall mount double-sided liquid crystal display, the first non-displaying surface of the first liquid crystal display panel unit is adjacent to the second non-displaying surface of the second liquid crystal display panel unit.

The wall mount double-sided liquid crystal display further comprises at least a fixing element which is movably fixed to the pivotal connection element.

In conclusion, a wall mount double-sided liquid crystal display of the present invention is simple in structure, lightweight, thin, adjustable in angle, and conducive to changing display contents quickly and conveniently.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
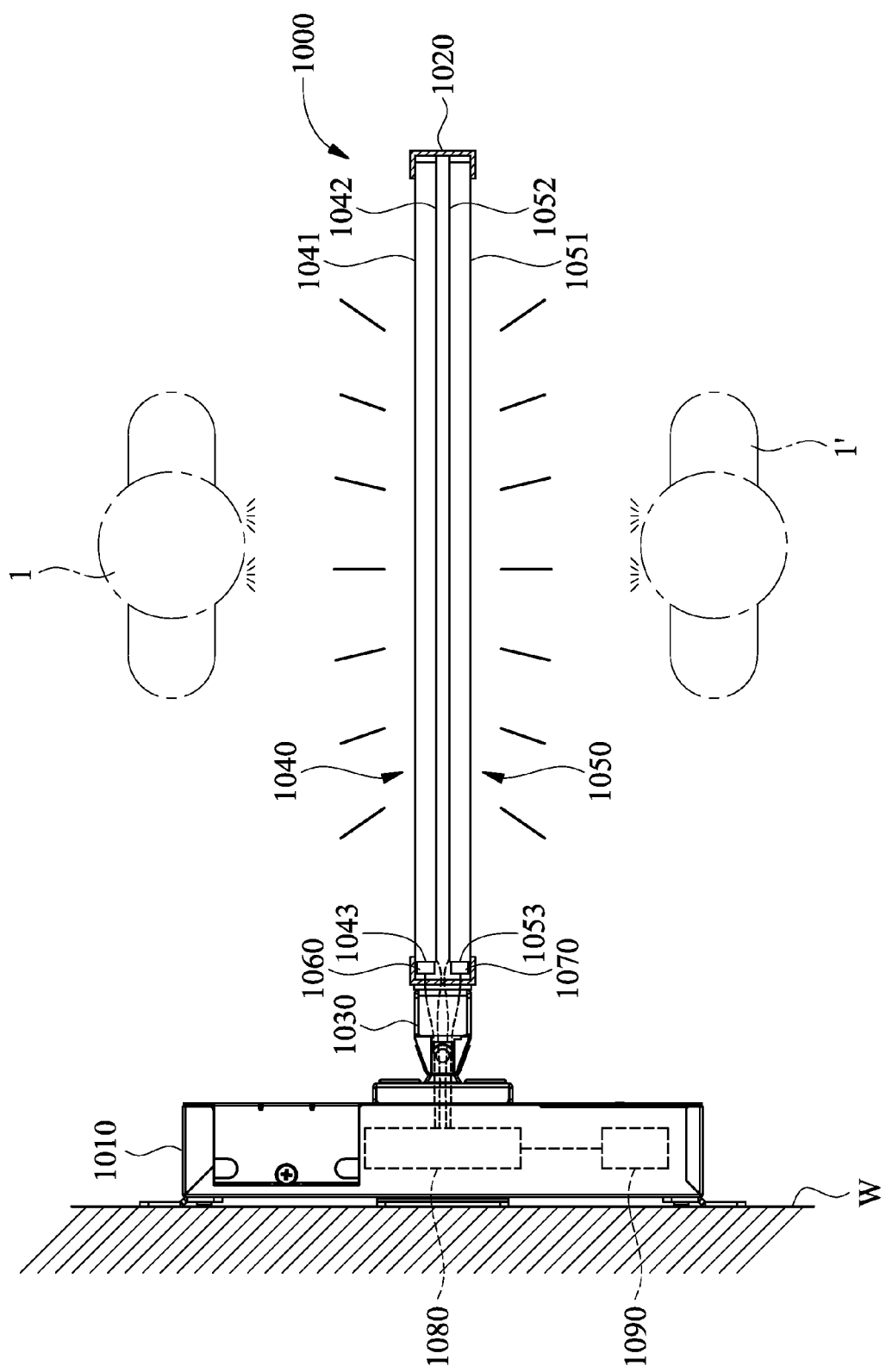
FIG. 1 is a schematic top view of a wall mount double-sided liquid crystal display according to the first embodiment of the present invention.

Referring to FIG. 1, there is shown a schematic top view of a wall mount double-sided liquid crystal display 1000 according to the first embodiment of the present invention. The wall mount double-sided liquid crystal display 1000 comprises a base 1010, a frame 1020, a pivotal connection element 1030, a first liquid crystal display panel unit 1040, a second liquid crystal display panel unit 1050, at least a first edge-lit backlight unit 1060, at least a second edge-lit backlight unit 1070, a control unit 1080, and a power unit 1090.

Figure 2:
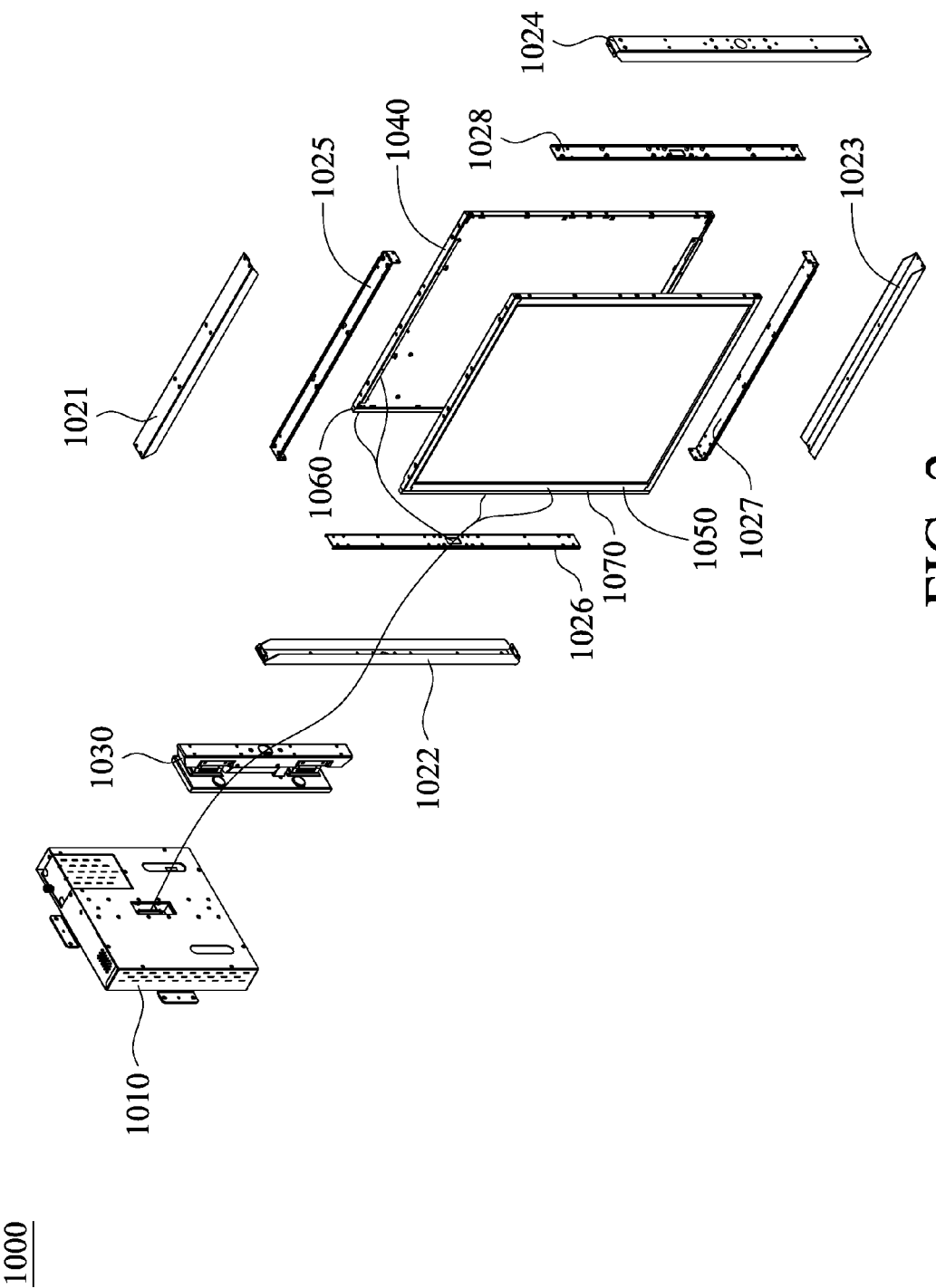
FIG. 2 is a partial exploded view of the wall mount double-sided liquid crystal display according to the first embodiment of the present invention.

The base 1010 is fixed to a wall W. The frame 1020 is pivotally connected to the base 1010 through the pivotal connection element 1030. An inside of the base 1010, an inside of the pivotal connection element 1030, and a space defined by and within the frame 1020 are in communication. Referring to FIG. 2, the frame 1020 comprises a plurality of support elements 1021-1028. The quantity of the support elements 1021-1028 is subject to changes according to the shape of the first liquid crystal display panel unit 1040 and the shape of the second liquid crystal display panel unit 1050.

Referring to FIG. 1, the first liquid crystal display panel unit 1040 is disposed in the frame 1020. The first liquid crystal display panel unit 1040 has a first displaying surface 1041, a first non-displaying surface 1042, and a plurality of first lateral sides 1043.

The second liquid crystal display panel unit 1050 is disposed in the frame 1020 in a manner that the second liquid crystal display panel unit 1050 is parallel to the first liquid crystal display panel unit 1040. The second liquid crystal display panel unit 1050 has a second displaying surface 1051, a second non-displaying surface 1052, and a plurality of second lateral sides 1053. The first non-displaying surface 1042 is adjacent to the second non-displaying surface 1052.

The first edge-lit backlight unit 1060 is disposed in the frame 1020. The first edge-lit backlight unit 1060 is disposed at the first lateral sides 1043 of the first liquid crystal display panel unit 1040. In practice, it is feasible that the first edge-lit backlight unit 1060 is provided in the plural (not shown), and thus the first edge-lit backlight units 1060 are disposed at the first lateral sides 1043 of the first liquid crystal display panel unit 1040, respectively.

The second edge-lit backlight unit 1070 is disposed in the frame 1020. The second edge-lit backlight unit 1070 is disposed at the second lateral sides 1053 of the second liquid crystal display panel unit 1050. In practice, it is feasible that the second edge-lit backlight unit 1070 is provided in the plural (not shown), and thus the second edge-lit backlight units 1070 are disposed at the second lateral sides 1053 of the second liquid crystal display panel unit 1050, respectively.

The control unit 1080 is disposed in the base 1010 and electrically connected to the first liquid crystal display panel unit 1040, the second liquid crystal display panel unit 1050, the first edge-lit backlight unit 1060, and the second edge-lit backlight unit 1070. The control unit 1080 controls the first liquid crystal display panel unit 1040 and the second liquid crystal display panel unit 1050 in displaying an information or an advertisement.

The power unit 1090 is disposed in the base 1010, electrically connected to the control unit 1080, and adapted to supply power to the wall mount double-sided liquid crystal display 1000.

Figure 3:
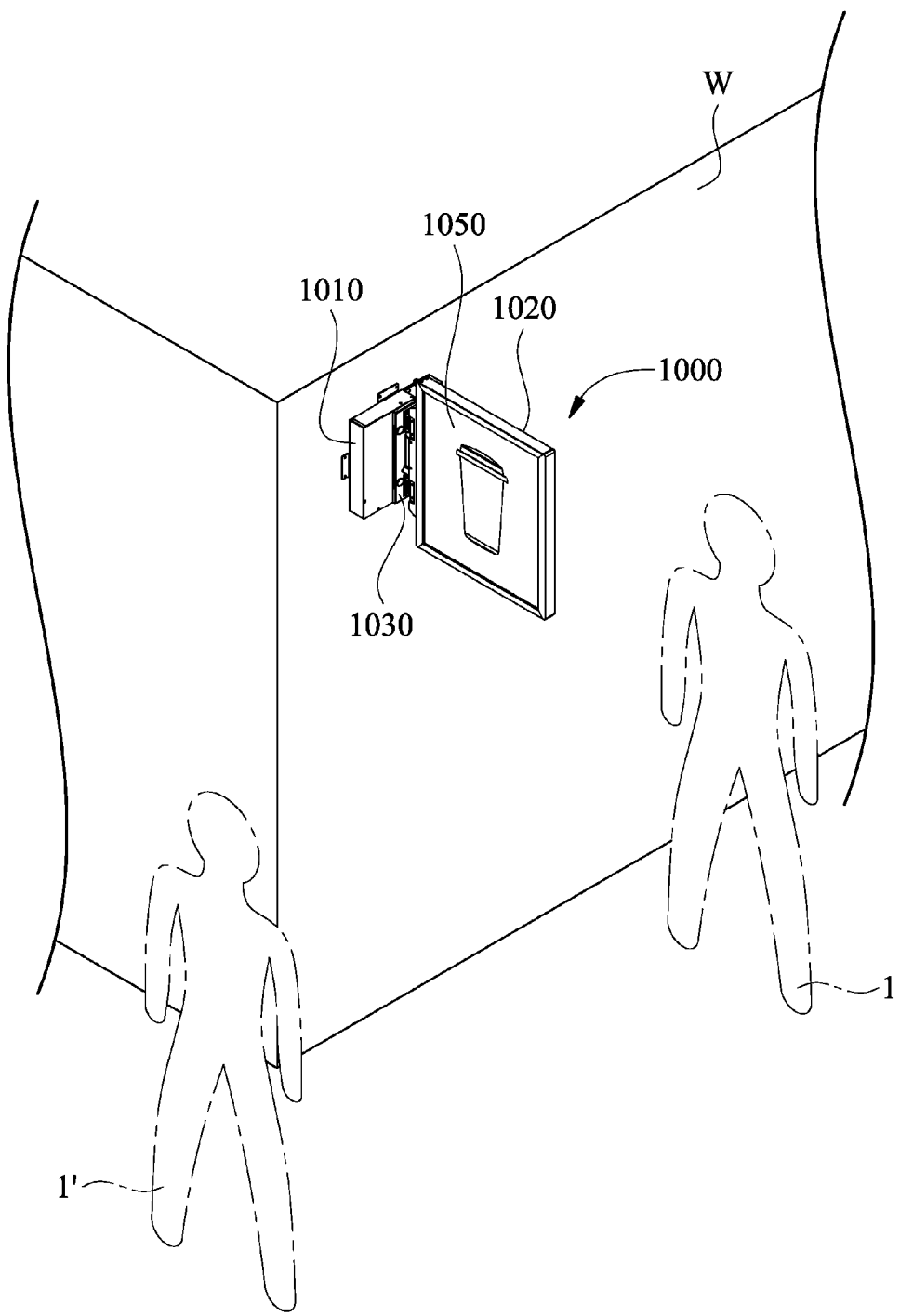
FIG. 3 is a schematic view of the wall mount double-sided liquid crystal display and a plurality of lookers according to the first embodiment of the present invention.

Referring to FIG. 1 and FIG. 3, when the wall mount double-sided liquid crystal display 1000 is fixed to the wall W. The first liquid crystal display panel unit 1040 and the second liquid crystal display panel unit 1050 each display, for example, an image of a coffee cup. The two images of a coffee cup are displayed on the first liquid crystal display panel unit 1040 and the second liquid crystal display panel unit 1050, respectively, and are visible to lookers 1, 1', respectively.

In conclusion, the present invention provides a wall mount double-sided liquid crystal display characterized in that: a first liquid crystal display panel unit and a second liquid crystal display panel unit are adjacent to each other; a first edge-lit backlight unit, a second edge-lit backlight unit, a control unit, and a power unit are disposed at a base to reduce the required thickness of a frame; an information or an advertisement displayed on the first liquid crystal display panel unit and the second liquid crystal display panel unit can be changed quickly and conveniently by the owner of the wall mount double-sided liquid crystal display; the wall mount double-sided liquid crystal display is lightweight and simple in structure; and with the frame being pivotally connected to the base through at least a pivotal connection element, the frame is rotatable relative to the base so as to effectuate adjustment of angle.

Figure 4:
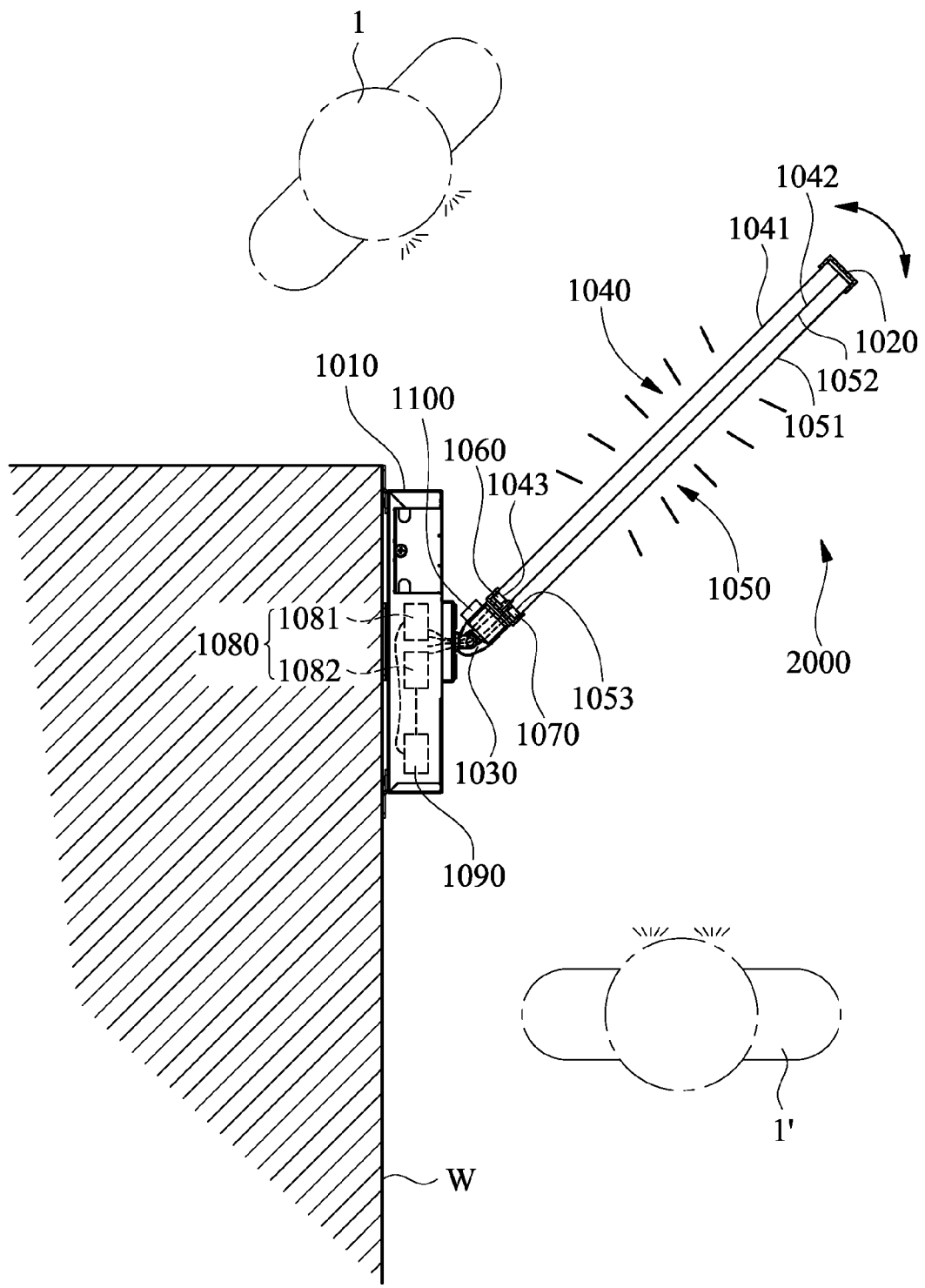
FIG. 4 is a schematic view of the wall mount double-sided liquid crystal display according to the second embodiment of the present invention.

Referring to FIG. 4, there is shown a schematic view of a wall mount double-sided liquid crystal display 2000 according to the second embodiment of the present invention. As shown in the diagram, the wall mount double-sided liquid crystal display 2000 is fixed to the wall W and positioned proximate to an external corner of the wall W. The wall mount double-sided liquid crystal display 2000 is substantially the same as the wall mount double-sided liquid crystal display 1000 except that the wall mount double-sided liquid crystal display 2000 comprises the control unit 1080 which has a first control unit 1081 and a second control unit 1082. The first control unit 1081 is electrically connected to the first liquid crystal display panel unit 1040 and the first edge-lit backlight unit 1060. The second control unit 1082 is electrically connected to the second liquid crystal display panel unit 1050 and the second edge-lit backlight unit 1070. The first control unit 1081 controls the first liquid crystal display panel unit 1040 in displaying a first information or a first advertisement. The second control unit 1082 controls the second liquid crystal display panel unit 1050 in displaying a second information or a second advertisement. Hence, at the same point in time, the information or advertisement displayed on the first liquid crystal display panel unit 1040 is different from the information or advertisement displayed on the second liquid crystal display panel unit 1050.

Since the base 1010 of the wall mount double-sided liquid crystal display 2000 is fixed to the wall W and positioned proximate to an external corner thereof, it is practicable to adjust the angle of the frame 1020 of the wall mount double-sided liquid crystal display 2000 so that both the lookers 1, 1' can see the wall mount double-sided liquid crystal display 2000. To this end, the angle of the frame 1020 is adjusted, for example, to be 45°, by the pivotal connection element 1030 and then fixed by a fixing element 1100 by fixing the pivotal connection element 1030 in place.

The angle of the frame 1020 is not restricted to what is shown in FIG. 4. For example, it is practicable that both the first liquid crystal display panel unit 1040 and the second liquid crystal display panel unit 1050 are parallel to the wall W.

As the first non-displaying surface 1042 of the first liquid crystal display panel unit 1040 is adjacent to the second non-displaying surface 1052 of the second liquid crystal display panel unit 1050, the thickness of the wall mount double-sided liquid crystal display 2000 is minimized.

Although FIG. 1 through FIG. 4 show that the first liquid crystal display panel unit 1040 and the second liquid crystal display panel unit 1050 are rectangular, the present invention is not limited thereto. In practice, the first liquid crystal display panel unit 1040 and the second liquid crystal display panel unit 1050 can be round, elliptical, and triangular, etc.

In conclusion, according to the present invention, the display contents, such as an advertisement, of a wall mount double-sided liquid crystal display can be changed quickly and conveniently, and the wall mount double-sided liquid crystal display is advantageously simple in structure, lightweight, thin, and adjustable in angle.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A wall mount double-sided liquid crystal display fixed to a wall, the wall mount double-sided liquid crystal display comprising:
   a base fixed to the wall;
   a frame pivotally connected to the base through at least a pivotal connection element;
   a first liquid crystal display panel unit disposed in the frame and having a first displaying surface, a first non-displaying surface, and a plurality of first lateral sides;
   a second liquid crystal display panel unit disposed in the frame in a manner to be parallel to the first liquid crystal display panel unit and having a second displaying surface, a second non-displaying surface, and a plurality of second lateral sides, wherein the first and second non-displaying surfaces are adjacent to each other;
   at least a first edge-lit backlight unit disposed in the frame and at the first lateral sides of the first liquid crystal display panel unit;
   at least a second edge-lit backlight unit disposed in the frame and at the second lateral sides of the second liquid crystal display panel unit;
   a control unit disposed in the base and electrically connected to the first liquid crystal display panel unit, the second liquid crystal display panel unit, the first edge-lit backlight unit, and the second edge-lit backlight unit; and
   a power unit disposed in the base and electrically connected to the control unit.

2. The wall mount double-sided liquid crystal display of claim 1, wherein the control unit has a first control unit and a second control unit, the first control unit being electrically connected to the first liquid crystal display panel unit and the first edge-lit backlight unit, and the second control unit being electrically connected to the second liquid crystal display panel unit and the second edge-lit backlight unit.

3. The wall mount double-sided liquid crystal display of claim 2, further comprising at least a fixing element movably fixed to the pivotal connection element.

4. The wall mount double-sided liquid crystal display of claim 2, wherein the first non-displaying surface of the first liquid crystal display panel unit is adjacent to the second non-displaying surface of the second liquid crystal display panel unit.

5. The wall mount double-sided liquid crystal display of claim 4, further comprising at least a fixing element movably fixed to the pivotal connection element.

6. The wall mount double-sided liquid crystal display of claim 1, wherein the first non-displaying surface of the first liquid crystal display panel unit is adjacent to the second non-displaying surface of the second liquid crystal display panel unit.

7. The wall mount double-sided liquid crystal display of claim 6, further comprising at least a fixing element movably fixed to the pivotal connection element.

8. The wall mount double-sided liquid crystal display of claim 1, further comprising at least a fixing element movably fixed to the pivotal connection element.

* * * * *